(12) United States Patent
Dalgewicz, III et al.

(10) Patent No.: US 6,394,783 B1
(45) Date of Patent: May 28, 2002

(54) CONTINUOUS ROTARY MELT THERMOFORMER

(75) Inventors: Edward J. Dalgewicz, III, Fletcher, NC (US); John Bond, deceased, late of Pittsburgh, PA (US), by J. Charles Buff, attorney-in-fact

(73) Assignee: Apex Research Ltd., Inc., Jupiter, FL (US)

(*) Notice: Subject to any disclaimer, the term of this patent is extended or adjusted under 35 U.S.C. 154(b) by 0 days.

(21) Appl. No.: 09/535,953

(22) Filed: Mar. 27, 2000

(51) Int. Cl.$^7$ .......................... B29C 51/22; B29C 51/42; B29C 51/44

(52) U.S. Cl. .................... 425/388; 425/403.1; 425/402; 264/210.5; 264/503; 264/519

(58) Field of Search .............................. 425/388, 387.1, 425/383, 384, 402, 403.1; 264/503, 519, 177.19, 210.5, 310, 327

(56) References Cited

U.S. PATENT DOCUMENTS

| | | | |
|---|---|---|---|
| 3,314,110 A | 4/1967 | Missbach ..................... | 425/388 |
| 3,340,714 A | 9/1967 | Pohl et al. ................... | 264/292 |
| 3,381,445 A | 5/1968 | Vogt ............................ | 425/261 |
| 3,429,854 A | 2/1969 | Seckmauera et al. ........ | 264/547 |
| 3,496,143 A | 2/1970 | Siggel et al. ................. | 264/544 |
| 3,676,537 A | 7/1972 | Winstead ..................... | 264/48 |
| 3,753,830 A | * 8/1973 | Cruckshank et al. ........ | 425/388 |
| 3,846,526 A | * 11/1974 | Wade ........................... | 264/46.8 |
| 3,865,302 A | 2/1975 | Kane ........................... | 156/69 |
| 3,931,383 A | 1/1976 | Erlewine et al. ............. | 264/92 |
| 3,947,205 A | * 3/1976 | Edwards ................... | 425/387 B |
| 4,039,609 A | 8/1977 | Thiel et al. .................. | 264/210 |
| 4,061,706 A | 12/1977 | Duffield et al. ............. | 425/388 |
| 4,127,631 A | 11/1978 | Dempsey et al. ............ | 264/92 |
| 4,234,530 A | 11/1980 | Thiel et al. .................. | 264/522 |
| 4,234,536 A | 11/1980 | Thiel et al. .................. | 264/522 |
| 4,250,129 A | 2/1981 | Winstead ..................... | 425/363 |
| 4,284,396 A | 8/1981 | Thissen et al. ........... | 425/342.1 |
| 4,388,356 A | 6/1983 | Hrivnak et al. ............. | 264/547 |
| 4,413,964 A | 11/1983 | Winstead ..................... | 425/388 |

(List continued on next page.)

FOREIGN PATENT DOCUMENTS

| | | |
|---|---|---|
| DE | 1906430 | 8/1970 |
| EP | 0088 625 A1 | 9/1983 |
| GB | 1 232 555 | 5/1971 |
| GB | 2 205 063 A | 11/1988 |
| JP | 54-102372 | 11/1979 |
| WO | WO 91/09723 | 7/1991 |

OTHER PUBLICATIONS

International Search Report from PCT/US 00/23654, dated Dec. 28, 2000.

*Primary Examiner*—Nam Nguyen
*Assistant Examiner*—Thu Khanh T. Nguyen
(74) *Attorney, Agent, or Firm*—Banner & Witcoff, Ltd.

(57) ABSTRACT

An apparatus for thermoforming a thermoplastic article comprises an extrusion die for extruding a sheet of thermoplastic and a rotating wheel having at least one mold member. The mold member includes a male mold or forming cavity for receiving at least a portion of a substantially non-oriented (i.e., non-tensioned) thermoplastic sheet. The mold member is selectively heated and/or cooled during thermoforming to maintain the sheet in a molten or thermoformable state. The mold member also comprises a stripper plate maintained at a predetermined temperature or temperature distribution for inducing a predetermined degree of crystallinity to the sheet. The stripper plate enables the articles to be separated from the mold without distortion. In one embodiment, the thermoformed article has at least two and preferably at least three distinct regions of thermally-induced crystallinity.

15 Claims, 4 Drawing Sheets

U.S. PATENT DOCUMENTS

| | | | |
|---|---|---|---|
| 4,420,300 A | 12/1983 | Winstead | 425/142 |
| 4,469,270 A | 9/1984 | Gartland | 264/522 |
| 4,508,670 A * | 4/1985 | Janke | 425/387.1 |
| 4,563,320 A | 1/1986 | Morgan | 264/151 |
| 4,582,665 A | 4/1986 | Jabarin | 264/544 |
| 4,722,820 A | 2/1988 | Flecknoe-Brown | 425/388 |
| 4,822,553 A * | 4/1989 | Marshall | 425/388 |
| 4,994,229 A | 2/1991 | Flecknoe-Brown | 264/522 |
| 5,023,137 A | 6/1991 | Smith et al. | 428/34.1 |
| 5,614,145 A | 3/1997 | O'Kane | 264/548 |
| 5,614,228 A | 3/1997 | Demerest | 425/326.1 |
| 5,783,229 A | 7/1998 | Manlove | 425/388 |
| 6,086,800 A | 7/2000 | Manlove | 264/37.32 |

* cited by examiner

CONTINUOUS ROTARY MELT THERMOFORMER

FIELD OF THE INVENTION

The present invention is directed to thermoforming and, more particularly, to an apparatus for thermoforming polyesters into articles such as ovenable containers.

BACKGROUND OF THE INVENTION

Continuous vacuum-forming devices for making containers from thermoplastic sheets typically utilize a continuous sheet of molten plastic which is extruded and vacuum-formed on a continuous belt or a rotating drum having a plurality of mold cavities. Many of these devices utilize residual heat from the extrusion process, thus avoiding the need to reheat the plastic sheet prior to thermoforming. It generally is considered desirable that heat-set articles such as ovenable containers have relatively uniform thermal crystallinity throughout the article to provide adequate dimensional stability and impact resistance. For example, Demerest U.S. Pat. No. 5,614,228 describes a continuous rotary thermoforming apparatus in which a sheet of molten polyethylene terephthalate is extruded and vacuum-formed on a rotating drum having a plurality of mold cavities around its circumference. A hot oil circuit and electric heating elements are provided to impart different amounts of heat to different locations of the sheet during thermoforming. According to Demerest, additional heat is applied to portions of the articles which have a greater wall thickness to produce more uniform crystallinity throughout the article. The sheet is required to be tensioned and oriented during article forming to prevent the sheet from warping or otherwise distorting during cooling. Orienting the sheet also is said to result in articles having high impact resistance.

Several drawbacks exist with the type of thermoforming device described by Demerest. For example, a minimum amount of crystallinity, which is stated to be at least about 20%, must be obtained in the article to permit the article to be removed from the mold cavity without significant distortion. Thus, the device is not useful for applications where lower degrees of crystallinity may be desired in an article or a portion thereof. Moreover, the degrees of crystallinity actually obtained by using the Demerest apparatus typically are significantly higher than the stated minimum degree, and cannot be controlled effectively. Another drawback is that forming the sheet under tension results in distortion of the article after molding, which limits the ability of the apparatus to be used for many applications requiring especially high tolerances.

The device described in Demerest also is limited in terms of production speed. Following thermoforming, the articles undergo a series of cooling and drying steps prior to being separated from the mold cavities. The formed sheets are (again) tensioned to prevent distortion during separation from the mold. This type of procedure places severe limitations on production rates, especially for larger sized articles.

Gartland U.S. Pat. No. 4,469,270 describes a discontinuous thermoforming apparatus having a mold for thermoforming a plastic article having a flange portion. Vacuum and/or pressurized gas is used to conform a sheet to the shape of the heated mold. External cooling means are provided to maintain a portion of the flange of the article at a temperature which is said to be insufficient to induce undesirable thermal crystallization. This portion of the article preferably has a degree of crystallinity of not more than 10% to improve adhesion of lidding films to the article. The remaining portions of the flange and the remainder of the article preferably have the same average crystallinity.

It would be desirable to develop an apparatus for thermoforming articles which have excellent heat resistance and dimensional stability. It also would be desirable to develop an apparatus for thermoforming articles which exhibit excellent stress relaxation and which do not undergo distortion during cooling. It would be especially desirable to develop an apparatus capable of faster production times while substantially avoiding distortion, even for the production of larger sized articles.

SUMMARY OF THE INVENTION

The present invention is directed to an improved apparatus for thermoforming a thermoplastic article. The apparatus comprises a rotating wheel having one or more mold members. The mold member includes a molding surface, such as a male mold or a forming cavity (female mold) for receiving at least a portion of a substantially non-oriented thermoplastic sheet, and heat transfer means for heating and/or cooling the mold member to a temperature sufficient to maintain at least a portion of the thermoplastic sheet in a molten or thermoformable state. The apparatus also comprises a stripper plate which is maintained at a different (preferably lower) temperature than the mold member.

By maintaining the stripper plate at a controlled temperature, thermally-induced crystallinity in the adjacent portions of the sheet can be precisely controlled. This configuration permits the sheet to be formed without the need for tensioning or orienting, resulting in significantly improved product definition and, especially, retained product definition. It is particularly preferred that the sheet not be tensioned or oriented in either direction so as to eliminate post-mold distortion. The apparatus configuration also improves accuracy and precision of product trimming by reducing distortion normally attendant with changes in thermally-induced crystallinity as the sheet is heated and cooled during processing. As a result, the articles can be separated from the mold more rapidly following forming, which facilitates faster overall production rates.

The apparatus of the present invention additionally permits more precise control of thermally-induced crystallinity in thermoformed articles. The degree of crystallinity in products can be tailored to a particular application, e.g., in the manufacture of food containers such as microwave-ovenable containers, dual-ovenable containers, and the like. Significantly, the degree of crystallinity in the thermoformed article is not governed by manufacturing limitations. For example, unlike conventional continuous thermoforming devices, no "minimum" degree of crystallinity is required to enable the articles to be separated from the mold without distortion. Rather, the degree of crystallinity in an article can be selectively controlled in accordance with a degree most suitable for a particular application.

The apparatus also preferably includes one or more rolls or pairs of rolls for shaping and cooling the thermoplastic sheet from the extruder. The apparatus preferably has means for removing the entirety of the web, including the molded articles, from the forming cavity. In an alternative embodiment, the apparatus has means for separating (trimming) the molded articles from the plastic web while the articles are still in the mold, and means for ejecting each article individually from the mold.

In accordance with one preferred embodiment of the present invention, the mold member includes means for maintaining a predetermined temperature distribution therein. The predetermined temperature distribution results in thermoformed articles having at least two, and preferably at least three distinct regions of thermally-induced crystallinity. This can be accomplished, for example, by providing means for selectively heating portions of the forming cavity and, optionally, means for selectively cooling portions of the forming cavity. In addition, insulating elements can be provided to separate various components of the mold member to assist in establishing the desired temperature distribution.

While the plastic sheet in a thermoformable state is in contact with the mold, regions of the mold can be selectively heated to increase the rate of thermal crystallization or cooled to decrease the rate of thermal crystallization relative to other regions, to achieve the desired degree of crystallinity in each region. Within each region of the thermoformed article, either a substantially uniform degree of crystallinity can be present or, alternatively, a predetermined crystallinity gradient can exist. It has been found that thermoformed articles having excellent heat resistance and dimensional stability can be produced which also exhibit excellent stress relaxation, so as to essentially eliminate distortion during cooling without requiring excessively high degrees of crystallization. The apparatus of the present invention is particularly useful for making food containers, especially cooking containers such as ovenable food containers and dual-ovenable food containers.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

Suitable thermoplastic materials for use with the present invention include but are not limited to polyesters such as polyethylene terephthalate (PET). Preferred materials include those modified polyesters described in co-pending application Ser. No. 09/453,457, filed Dec. 2, 1999, the disclosure of which is incorporated by reference in its entirety and for all purposes. The degree of crystallinity of thermoplastic polymers typically is measured by differential scanning calorimetry (DSC). The terms "crystallization temperature" and "crystallization onset" are used interchangeably to mean the temperature or temperature range in which a regularly repeating morphology, brought about by a combination of molecular mobility and secondary bonding forces, is induced in a polymer over a molecular distance of at least several hundred angstroms. In PET, for example, the crystallization temperature or crystallization onset can be visually observed as the point at which a substantially amorphous, non-oriented sheet of PET changes from a translucent, hazy appearance to a white appearance.

Figure 1:
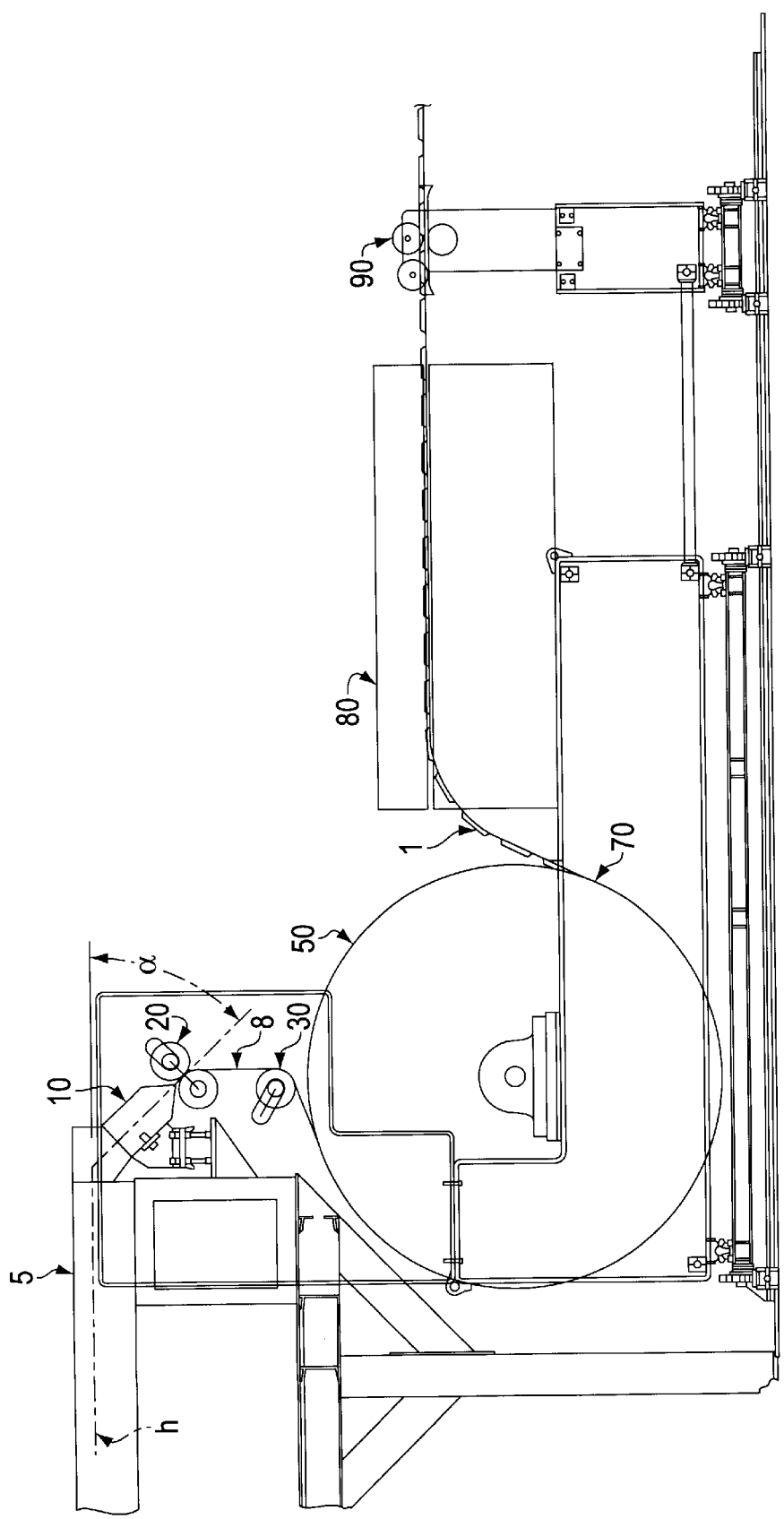
FIG. 1 is an illustration of a continuous melt phase thermoformer in accordance with one embodiment of the invention.

With reference to FIG. 1, in accordance with a preferred embodiment of the present invention, a plastic material to be thermoformed is processed through an extrusion die 10 to form a plastic sheet 8 of desired thickness. The extrusion die 10 receives molten thermoplastic material from an extruder 5. The extrusion die forms a plastic sheet 8 which exits the die 10 in a plane disposed at any suitable angle α relative to the horizontal axis h. To provide thermoformed articles having excellent dimensional stability, especially at elevated temperatures, it is particularly preferred that the plastic sheet 8 not be stretched or oriented in either direction. The extruder 5 can be, for example, a single-screw or twin-screw extruder.

Upon exiting the extrusion die 10, the plastic sheet 8 optionally is fed over one or more rolls 30 or pairs of rolls 20 rotatably supported on the apparatus. The rolls 20, 30 can be used to shape and cool the surface of the plastic sheet 8 to establish a thermal gradient therein. The plastic sheet 8, however, should remain at a temperature suitable for vacuum forming, i.e., in a molten or thermoformable state. The rolls 20, 30 also can be used to laminate additional plastic sheet(s), to emboss the article, and the like. As will be apparent to those skilled in the art, other types of devices additionally or alternatively can be used to treat the plastic sheet 8, e.g., subsequent to extrusion and prior to thermoforming, without departing from the spirit or scope of the invention.

Figure 3B:
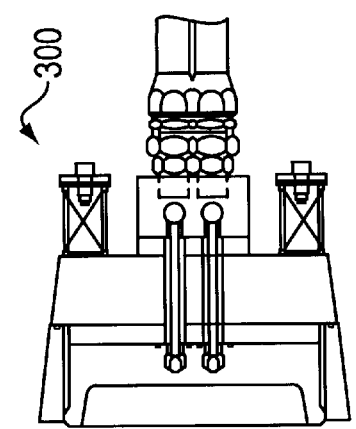
FIG. 3 is an illustration of a flat containing a plurality of molding cavities in accordance with a preferred embodiment of the invention.
Figure 3A:
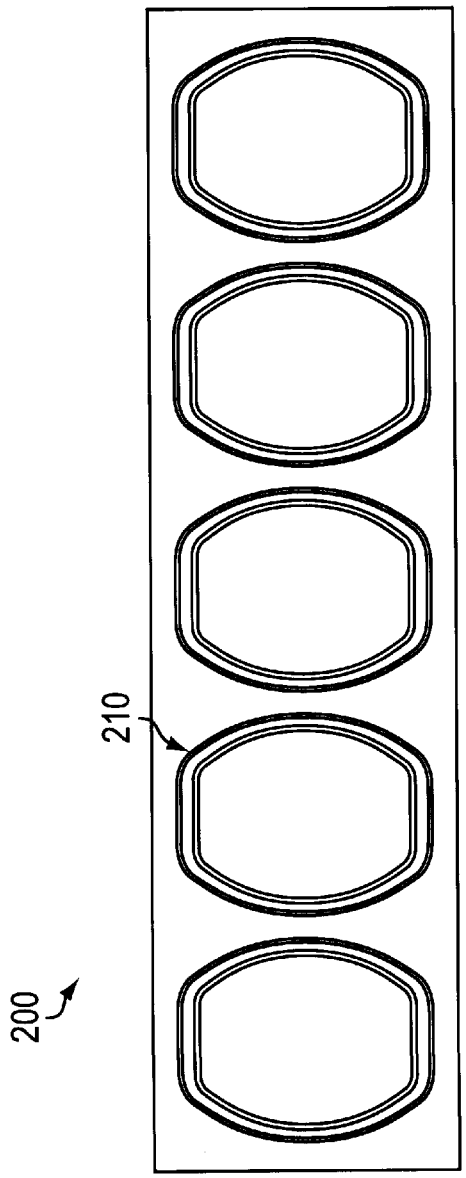
Figure 4:
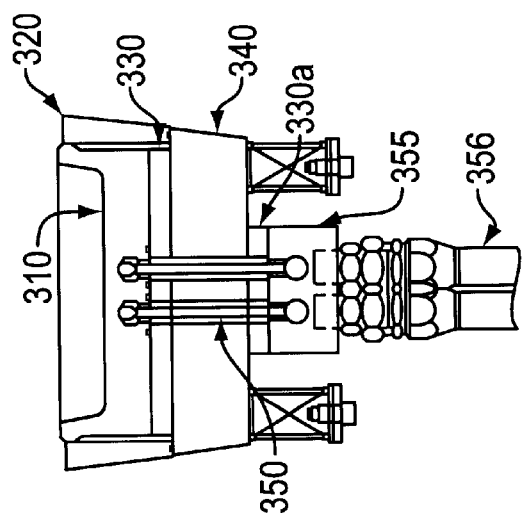
FIG. 4 is a side view of a mold member.

With reference to FIGS. 1, 3, and 4, the plastic sheet 8 is brought into contact with a rotating wheel 50 having a plurality of mold members 300 each having a forming cavity 310 (female mold). As will be understood by those skilled in the art, the forming cavity 310 is perforated or vented so that vacuum may be drawn in the mold. A vacuum device (not illustrated) is provided for drawing a vacuum through perforations (not illustrated) in the forming cavity 310. The vacuum underpressure draws the plastic sheet 8 into the forming cavity 310 to form an article in the shape of the forming cavity 310. In this way, the plastic sheet 8 is drawn into contact with the mold while any air trapped between the plastic sheet 8 and the forming cavity 310 is removed through the perforations.

As illustrated in FIG. 3, in accordance with one embodiment of the invention, a flat 200 contains five parallel, spaced mold members 210 for receiving the extruded sheet 8. It will be apparent to those skilled in the art that fewer or more mold members 210 can be provided on a flat 200 as desired. A flat 200 can contain as few as one mold member, and there is no upper limit contemplated on the number of mold members 210 per flat 200. Selection of a suitable number of mold members 210 per flat 200 can be made according to such factors as, for example, cost, throughput, size of the thermoformed articles, size of the apparatus, energy requirements, etc. The rotating wheel preferably is of a size suitable to contain a plurality (e.g., 10 to 30 or more) of flats 200 arranged around its circumference. In one preferred embodiment, the rotating wheel contains 28 flats each having five mold members 210.

In accordance with one embodiment of the invention, while the plastic sheet 8 is in contact with the forming cavity 310, regions of the forming cavity 310 are selectively heated so as to increase the rate of thermal crystallization relative to other regions to achieve the desired degree of crystallinity in each region. Regions of the forming cavity 310 also can be selectively cooled to decrease the rate of thermal crystallization in the region. As will be understood by the art, the degree of crystallinity imparted to a particular region of the article is a function of not only the thermoforming temperature, but also the identity and properties of the thermoplastic material, e.g., intrinsic viscosity (I.V.) and the like, and its thickness in the region.

The temperature in the mold cavity 310 can be controlled by any suitable heat transfer elements, e.g., heating, cooling, and/or insulating elements. For example, as illustrated in FIG. 4, a fluid such as oil can be supplied to a manifold 355 by hoses 356, and delivered through tubes 350 and into channels (not illustrated) extending through the mold 310. The configuration and location of the channels can be suitably selected to maintain a desired temperature or temperature distribution in the mold cavity 310.

Figure 5:
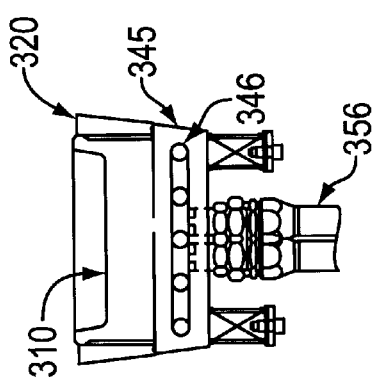
FIG. 5 is a side view of a mold member having electric heating elements in accordance with an alternative embodiment of the invention.

FIG. 5 illustrates another embodiment in which a heat transfer fluid is circulated through channels 346 extending through a heat transfer plate 345, which can be bolted or otherwise attached to the mold 310. In this embodiment, the mold cavity 310 is heated by conduction. The mold 310 and/or heat transfer plate 345 also may be equipped with optional electric heating elements (not illustrated) to selectively heat portions of the forming cavity 310. In any embodiment, fluid (e.g., oil) and electric heating elements can be used separately or in combination, or any other suitable means can be used for selectively heating and/or cooling portions of the forming cavity 310 in accordance with the present invention.

Figure 6:
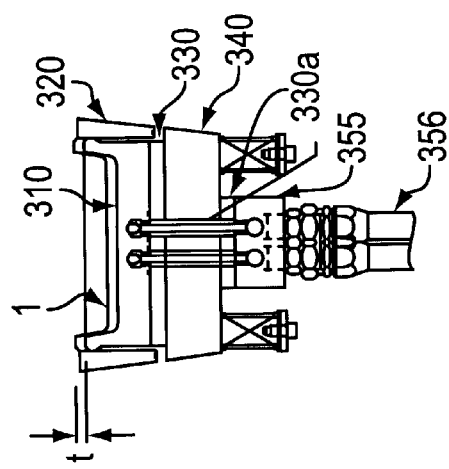
FIG. 6 is an illustration of a mold member having a stripper plate in the mechanical ejection position.

As illustrated in FIG. 4, a predetermined temperature distribution in the forming cavity 310 and stripper plate 320 can be obtained by using an appropriate combination of heating, cooling, and insulating elements. Insulator blocks 330, 330a are attached to and disposed between the heated mold and the mounting plate 340, and between the mounting plate 340 and the hot oil manifold 355, respectively. In addition, a heat transfer medium, such as water, optionally is circulated through a circuit (not illustrated) provided in the mold mounting plate 340 to selectively cool the mounting plate 340 and the stripper plate 320. As illustrated in FIGS. 4–6, the stripper plate 320 preferably is tapered to assist in establishing a desired temperature distribution therein. The top portion of the stripper plate 320 is the thickest, and thus the coolest portion. A heat transfer pin (not illustrated) also may be disposed in the mold 310, e.g., parallel to the stripper plate 320, to establish a desired temperature distribution in the stripper plate 320.

A feedback control device, such as a programmable logic controller (PLC), optionally is provided in combination with the heating and/or cooling means for controlling the temperature in the various portions of the forming cavity 310. Such temperature control devices can increase the cost of the apparatus, but also can enable even more precise control of crystallinity in the various regions of the article, as well as improve consistency among articles produced by the apparatus.

A thermoformed container has three distinct regions of crystallinity in accordance with a preferred embodiment of the invention. In this embodiment, the temperature distribution is such that the bottom portion of the forming cavity 310 is the hottest during thermoforming, typically from about 250 to about 450° F., while the sides and the upper portions of the forming cavity 310 are maintained at lower temperatures, with optional cooling. The bottom portion of the thermoformed article typically has greater than about 20% crystallinity, preferably from about 22% to about 35%. The bottom portion of the article thus has the highest heat resistance. The bottom portion of the article is substantially stress-free and maintains shaped-part (dimensional) stability, especially at elevated temperatures such as those typically encountered in cooking applications.

In this embodiment, the upper portion of the forming cavity 310 preferably is the coolest portion during thermoforming, resulting in a top (e.g., flange) region having lower thermal crystallinity. Crystallinity in the top region preferably is less than about 30% and more preferably is less than about 25%. The intermediate region of the article preferably is maintained at a thermoforming temperature between that of the bottom portion and that of the top portion of the forming cavity 310. The intermediate region of the thermoformed article thus has a degree of crystallinity between that of the bottom region and that of the top region. Within the intermediate region, a substantially uniform degree of crystallinity can be present, e.g., by maintaining a substantially uniform temperature within the intermediate region during thermoforming. Alternatively, intermediate region can have a crystallinity gradient, e.g., which ranges from the degree of crystallinity in the bottom region to that in the top region.

The present invention has been described primarily with reference to female molds (mold cavities). It also is contemplated that male molds can be employed in an analogous manner. A reverse temperature profile can be employed for male molds to form articles having similar crystallinity or regions of crystallinity as described above for female molds. For some applications, it may be desirable to have an inverse crystallinity gradient compared to that previously described, e.g., a higher degree of crystallinity at the top portion of the article and a lower degree of crystallinity at the bottom portion.

Other non-uniform distributions of crystallinity may be obtained so as to provide articles especially suited for particular purposes. It will be apparent to those skilled in the art that the temperature and/or temperature gradient in various regions can be suitably adjusted by selectively heating and/or cooling to obtain the desired degree of crystallization in each region. It is preferred that the predetermined temperature distribution in the mold result in thermoformed articles having at least two, and more preferably at least three, distinct regions of thermal crystallinity. Depending on such factors as the shape and the intended use of the thermoformed article, it may be advantageous to thermoform articles having four, five, six or even more distinct regions of thermal crystallinity in accordance with the present invention.

The article is maintained in the selectively-heated forming cavity 310 for a time sufficient to form and heat-set the article. The article 1 then is separated from the forming cavity 310, e.g., at an ejection station 70, by action of the stripper plate 320. FIG. 6 illustrates the mold member 300 with the stripper 320 plate in the mechanical ejection position. The mold 310 is displaced (e.g., toward the axis of the rotating wheel 50) in relation to the stripper plate 320 by a distance t sufficient to separate the article 1 therefrom. By controlling the temperature of the stripper plate and not imparting tension to the web, the article 1 can be separated from the mold 310 without or substantially without distortion. The temperature-controlled stripper plate 320 also facilitates removal of the articles 1 in less time after forming, thereby increasing production rates.

The article 1 can be removed from the forming cavity 310 by any suitable means, with or without in-mold trimming. In one embodiment, the articles 1 and the web of plastic between them (the "trim") are separated from the forming cavity 310 as a unit. The web can be fed through a trim press guide 90 to trim press 100 to remove the trim from the articles 1. Alternatively, the articles 1 can be trimmed while still in the forming cavity 310 by a suitable in-mold trimming device (not illustrated). In either embodiment, the articles 1 can be treated in an optional post-mold conditioning/treatment unit 80 which may provide one or more of heat treatment, heat removal, perforating, or the like.

Figure 2:
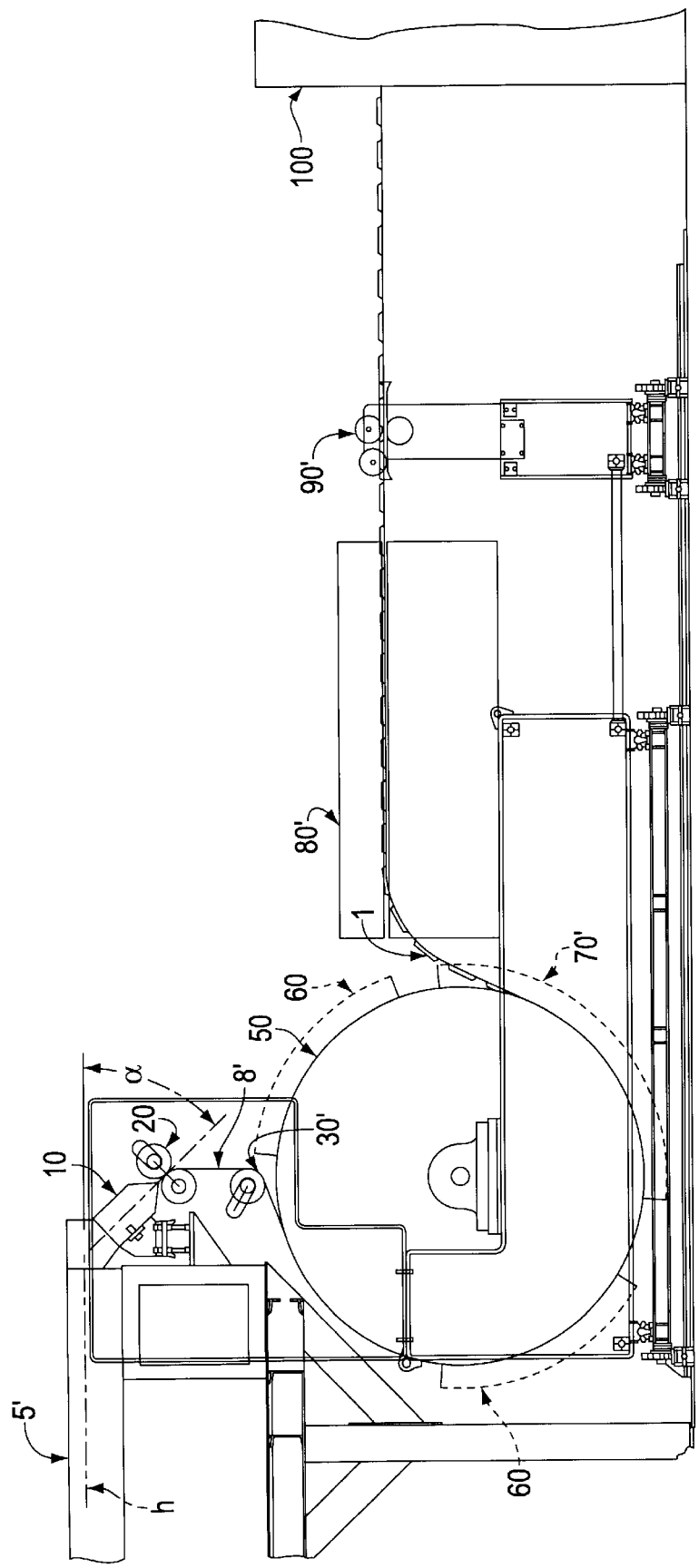
FIG. 2 is an illustration of a continuous melt phase thermoformer in accordance with an alternative embodiment of the invention.

FIG. 2 illustrates an alternative embodiment of the invention in which a single or twin-screw or co-extruder 5' is used for co-extruding a plastic sheet 8'. The plastic sheet 8' can have multiple layers, any of which can be solid layers, cellular layers, or the like. The plastic sheet 8' can be fed between a pair of shaping and cooling rolls 20, followed by a roll 30' which can further cool, shape, and/or emboss the sheet 8', and which optionally laminates one or more additional thermoplastic sheets (not illustrated) to the co-extruded sheet 8'. The apparatus also can include one or more conditioning stations 60 disposed around the rotating wheel. By way of example, the conditioning stations 60 can apply coatings, in-mold labels, paperboard, foil inserts, and the like. An adjustable mechanical ejection station 70' ejects the articles 1 from the forming apparatus 50. The ejection station 70' is mounted such that its position along the circumference of the rotating wheel can be adjusted, e.g., to permit rearrangement of the apparatus, maintenance, and the like. Upon exiting the forming apparatus 50, the formed articles 1 optionally are fed into a unit 80' having one or more post-mold treatments such as perforating, heating, heat removal, or the like. The article should not be tensioned at any time to avoid distortion of the formed product.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A continuous thermoforming apparatus comprising a rotating wheel having at least one mold member, said rotating wheel comprising:
   (i) at least one mold member having a mold surface for receiving at least a portion of a substantially non-oriented thermoplastic sheet;
   (ii) means for controlling the temperature of said mold surface to maintain said thermoplastic sheet in a thermoformable state;
   (iii) a stripper plate external to said mold member; and
   (iv) means for maintaining the temperature of said stripper plate at a different temperature than the temperature of said mold surface.

2. The continuous thermoforming apparatus of claim 1 wherein said means for controlling the temperature of said mold surface comprises at least one of heating means and cooling means.

3. The continuous thermoforming apparatus of claim 2 wherein said means for controlling the temperature of said mold surface further comprises insulating means.

4. The continuous thermoforming apparatus of claim 2 wherein said cooling means comprises a circuit for circulating a fluid through a portion of said mold member.

5. The continuous thermoforming apparatus of claim 2 wherein said heating means is selected from the group consisting of a hot oil circuit, a plurality of electric heating elements, and a combination thereof.

6. The continuous thermoforming apparatus of claim 1 wherein said stripper plate is maintained at a temperature lower than the temperature of said mold surface.

7. The continuous thermoforming apparatus of claim 1 further comprising means for displacing said mold surface relative to said stripper plate to selectively separate said thermoplastic sheet from said mold surface.

8. A continuous thermoforming apparatus comprising a rotating wheel having at least one mold member, said rotating wheel comprising:
   (i) at least one mold member having a mold cavity for receiving at least a portion of a substantially non-oriented thermoplastic sheet;
   (ii) means for controllably heating said mold cavity, and optionally means for controllably cooling said mold cavity, to maintain said thermoplastic sheet in a thermoformable state;
   (iii) a stripper plate external to said mold member; and
   (iv) means for cooling said stripper plate to controllably maintain said stripper plate at a temperature lower than the temperature of said mold cavity.

9. A continuous thermoforming apparatus comprising:

means for co-extruding at least two distinct thermoplastic layers through an extrusion die to form a co-extrudate in a substantially non-oriented state; and a rotating wheel comprising:
   (i) at least one mold member having a mold surface for receiving at least a portion of the co-extrudate;
   (ii) means for controlling the temperature of said mold surface to maintain the co-extrudate in a thermoformable state;
   (iii) a stripper plate external to the mold surface; and
   (iv) means for maintaining the temperature of said stripper plate at a different temperature than the temperature of said mold surface.

10. The continuous thermoforming apparatus of claim 9 further comprising means for displacing said mold surface relative to said stripper plate to selectively separate said co-extrudate from said mold surface.

11. The continuous thermoforming apparatus of claim 9 wherein said means for controlling the temperature of said mold surface comprises at least one of heating means and cooling means.

12. The continuous thermoforming apparatus of claim 11 wherein said means for controlling the temperature of said mold surface further comprises insulating means.

13. The continuous thermoforming apparatus of claim 11 wherein said cooling means comprises a circuit for circulating a fluid through a portion of said mold member.

14. The continuous thermoforming apparatus of claim 11 wherein said heating means is selected from the group consisting of a hot oil circuit, a plurality of electric heating elements, and a combination thereof.

15. The continuous thermoforming apparatus of claim 9 wherein said stripper plate is maintained at a temperature lower than the temperature of said mold surface.

* * * * *